(12) United States Patent
Cullen

(10) Patent No.: US 7,081,196 B2
(45) Date of Patent: *Jul. 25, 2006

(54) TREATMENT OF CRUDE OIL FRACTIONS, FOSSIL FUELS, AND PRODUCTS THEREOF WITH SONIC ENERGY

(76) Inventor: Mark Cullen, 5605 Brookmeadow La., Reno, NV (US) 89511

( * ) Notice: Subject to any disclaimer, the term of this patent is extended or adjusted under 35 U.S.C. 154(b) by 152 days.

This patent is subject to a terminal disclaimer.

(21) Appl. No.: 10/431,666

(22) Filed: May 8, 2003

(65) Prior Publication Data

US 2004/0035753 A1    Feb. 26, 2004

Related U.S. Application Data

(63) Continuation-in-part of application No. 09/863,127, filed on May 22, 2001, now abandoned.

(51) Int. Cl.
C10G 45/04    (2006.01)
(52) U.S. Cl. .................. 208/211; 208/213; 208/208 R; 208/196; 208/192; 208/222; 208/227; 208/229; 44/904; 44/628
(58) Field of Classification Search ..................... None
See application file for complete search history.

(56) References Cited

U.S. PATENT DOCUMENTS

| | | | |
|---|---|---|---|
| 2,253,308 A | 8/1941 | Rosen | |
| 2,671,049 A | 3/1954 | Brown | |
| 2,697,682 A | 12/1954 | Porter | |
| 2,834,717 A | 5/1958 | Shiah | |
| 3,284,342 A | 11/1966 | Nathan | |
| 3,341,448 A | 9/1967 | Ford | |
| 3,565,793 A | 2/1971 | Herbstman | |
| 3,595,778 A | 7/1971 | Smetana | |
| 3,719,589 A | 3/1973 | Herbstman | |
| 3,816,301 A * | 6/1974 | Sorgenti | ................. 208/208 R |
| 3,945,914 A | 3/1976 | Yoo | |
| 5,824,214 A | 10/1998 | Paul et al. | |
| 5,948,242 A | 9/1999 | Ohsol et al. | |
| 5,985,137 A | 11/1999 | Ohsol et al. | |
| 6,402,939 B1 | 6/2002 | Yen et al. | |
| 6,402,940 B1 | 6/2002 | Rappas | |
| 6,406,616 B1 | 6/2002 | Rappas et al. | |
| 6,500,219 B1 * | 12/2002 | Gunnerman | ................. 44/904 |
| 2002/0029997 A1 | 3/2002 | Rappas et al. | |
| 2003/0014911 A1 | 1/2003 | Gunnerman | |
| 2003/0019791 A1 | 1/2003 | Austin | |
| 2003/0085156 A1 | 5/2003 | Schoonover | |

FOREIGN PATENT DOCUMENTS

| | | |
|---|---|---|
| EP | 0482841 A1 | 10/1999 |
| WO | WO 00/15734 | 1/2000 |

OTHER PUBLICATIONS

Hu, Michael C., Rigorous Hydrotreater Simulation, PTQ, Spring 2002, pp. 85-91.
Liotta, Frank J., Production of Ultra-Low Sulfur Fuels by Selective Hydroperoxide Oxidation, National Petrochemical & Refiners Association Annual Meeting, Mar. 23-25, 2003, pp. 1-9.

* cited by examiner

*Primary Examiner*—Tam M. Nguyen
(74) *Attorney, Agent, or Firm*—Stetina Brunda Garred & Brucker

(57) ABSTRACT

In crude oil fractions, fossil fuels, and organic liquids in general in which it is desirable to reduce the levels of sulfur-containing and nitrogen-containing components, the process reduces the level of these compounds via the application of sonic energy. The process can be performed both with and without the added presence of an oxidizing agent, and with or without elevated temperature and/or pressure. The invention is performed either as a continuous process or a batch process.

6 Claims, No Drawings

TREATMENT OF CRUDE OIL FRACTIONS, FOSSIL FUELS, AND PRODUCTS THEREOF WITH SONIC ENERGY

CROSS-REFERENCE TO RELATED APPLICATIONS

The present application is a continuation-in-part of U.S. application Ser. No. 09/863,127, filed May 22, 2001 now abandoned by Gunnennan et al, entitled A TREATMENT OF CRUDE OIL FRACTIONS, FOSSIL FUELS, AND PRODUCTS THEREOF WITH ULTRASOUND, the teachings of which are expressly incorporated herein by reference.

STATEMENT RE: FEDERALLY SPONSORED RESEARCH/DEVELOPMENT

Not Applicable

BACKGROUND OF THE INVENTION

1. Field of the Invention

This invention resides in the field of chemical processes for the treatment of crude oil fractions and the various types of products derived and obtained from these sources. In particular, this invention addresses reformation processes as ring-opening reactions and the saturation of double bonds, to upgrade fossil fuels and convert organic products to forms that will improve their performance and expand their utility. This invention also resides in the removal of sulfur-containing compounds, nitrogen-containing compounds, and other undesirable components from petroleum and petroleum-based fuels.

2. Description of the Prior Art

Fossil fuels are the largest and most widely used source of power in the world, offering high efficiency, proven performance, and relatively low prices. There are many different types of fossil fuels, ranging from petroleum fractions to coal, tar sands, and shale oil, with uses ranging from consumer uses such as automotive engines and home heating to commercial uses such as boilers, furnaces, smelting units, and power plants.

Fossil fuels and other crude oil fractions and products derived from natural sources contain a vast array of hydrocarbons differing widely in molecular weight, boiling and melting points, reactivity, and ease of processing. Many industrial processes have been developed to upgrade these materials by removing, diluting, or converting the heavier components or those that tend to polymerize or otherwise solidify, notably the olefins, aromatics, and fused-ring compounds such as naphthalenes, indanes and indenes, anthracenes, and phenanthracenes. A common means of effecting the conversion of these compounds is saturation by hydrogenation across double bonds.

For fossil fuels in particular, a growing concern is the need to remove sulfur compounds. Sulfur from sulfur compounds causes corrosion in pipeline, pumping, and refining equipment, the poisoning of catalysts used in the refining and combustion of fossil fuels, and the premature failure of combustion engines. Sulfur poisons the catalytic converters used in diesel-powered trucks and buses to control the emissions of oxides of nitrogen ($NO_x$). Sulfur also causes an increase in particulate (soot) emissions from trucks and buses by degrading the soot traps used on these vehicles. The burning of sulfur containing fuel produces sulfur dioxide which enters the atmosphere as acid rain, inflicting harm on agriculture and wildlife, and causing hazards to human health.

The Clean Air Act of 1964 and its various aniendinents have imposed sulfur emission standards that are difficult and expensive to meet. Pursuant to the Act, the United States Environmental Protection Agency has set an upper limit of 15 parts per million by weight (ppmw) on the sulfur content of diesel fuel, effective in mid-2006. This is a severe reduction from the standard of 500 ppmw in effect in the year 2000. For reformulated gasoline, the standard of 300 ppmw in the year 2000 has been lowered to 30 ppmw, effective Jan. 1, 2004. Similar changes have been enacted in the European Union, which will enforce a limit of 50 ppmw sulfur for both gasoline and diesel fuel in the year 2005. The treatment of fuels to achieve sulfur emissions low enough to meet these requirements is difficult and expensive, and the increase in fuel prices that this causes will have a major influence on the world economy.

The principal method of fossil fuel desulfurization in the prior art is hydrodesulfurization, i.e., the reaction between the fossil fuel and hydrogen gas at elevated temperature and pressure in the presence of a catalyst. This causes the reduction of organic sulfur to gaseous $H_2S$, which is then oxidized to elemental sulfur by the Claus process. A considerable amount of unreacted $H_2S$ remains however, with its attendant health hazards. A further limitation of hydrodesulfurization is that it is not equally effective in removing all sulfur-bearing compounds. Mercaptans, thioethers, and disulfides, for example, are easily broken down and removed by the process, while aromatic sulfur compounds, cyclic sulfur compounds, and condensed multicyclic sulfur compounds are less responsive to the process. Thiophene, benzothiophene, dibenzothiophene, other condensed-ring thiophenes, and substituted versions of these compounds, which account for as much as 40% of the total sulfur content of crude oils from the Middle East and 70% of the sulfur content of West Texas crude oil, are particularly refractory to hydrodesulfurization.

In light of the deficiencies associated with hydrodesulfurization, new processes have emerged, the most notable being oxidative desulfurization, that seek to effectuate sulfur removal with greater efficiency. Essentially, such process involves oxidizing sulfur species that may be present, typically through the use of an oxidizing agent, such as a hydroperoxide or peracid, to thus convert the sulfur compounds to sulfones. To facilitate such oxidative reaction, ultrasound may be applied as per the teachings of U.S. Pat. No. 6,402,939 issued to Yen et al., entitled OXIDATIVE DESULFURIZATION OF FOSSIL FUELS WITH ULTRASOUND; and U.S. Pat. No. 6,500,219 issued to Gunnerman, entitled CONTINUOUS PROCESS FOR OXIDATIVE DESULFURIZATION OF FOSSIL FUELS WITH ULTRASOUND AND PRODUCTS THEREOF, the teachings of each are expressly incorporated herein by reference.

Advantageously, oxidative desulfurization can be performed under mild temperatures and pressures, and further typically does not require hydrogen. Additionally advantageous is the fact that oxidative desulfurization requires much less in terms of capital expenditures to implement. In this respect, oxidative desulfurization can be selectively deployed to treat only a single fraction of refined petroleum, such as diesel, and can be readily integrated as a finishing process into existing refinery facilities. Perhaps most advantageous is the fact that oxidative desulfurization can substantially eliminate all sulfur species present in a given amount of crude oil such that ultra-low sulfur levels can be attained, and in particular the lower standards being set forth in various legislative requirements regarding sulfur content levels.

Despite such advantages, however, oxidative desulfurization is presently ineffectual for use in large scale refining operations insofar as currently deployed oxidative desulfurization techniques only partially oxidize the sulfur species present to sulfoxides, as opposed to sulfones. In this regard, present oxidative desulfurization techniques are too ineffectual and cannot achieve sufficient oxidation necessary to implement on a large scale basis. Moreover, to the extent the sulfur species is only partially oxidized (i.e., to sulfoxide), eventual removal of the sulfur species, which is typically accomplished either through solvent extraction or absorption based upon the differential polarity of the sulfones assumed to be present through such process, fails to facilitate the removal of the sulfoxide components based upon its lesser degree of polarity (i.e., as compared to sulfones). Accordingly, substantial refinements to oxidative desulfurization must be made before such technology can be practically implemented.

In addition to sulfur-bearing compounds, nitrogen-bearing compounds are also sought to be removed from fossil fuels, since these compounds tend to poison the acidic components of the hydrocracking catalysts used in the refinery. The removal of nitrogen-bearing compounds is achieved by hydrodenitrogenation, which is a hydrogen treatment performed in the presence of metal sulfide catalysts. Both hydrodesulfurization and hydrodenitrogenation require expensive catalysts as well as high temperatures (typically 400° F. to 850° F., which is equivalent to 204° C. to 254° C.) and pressures (typically 50 psi to 3,500 psi). These processes require a source of hydrogen or an on-site hydrogen production unit, which entails high capital expenditures and operating costs. In both of these processes, there is also a risk of hydrogen leaking from the reactor.

As such, there exists a substantial need in the art for systems and methods that are operative to effectuate the removal of sulfur from refined fossil fuels that is substantially effective in removing virtually all of the sulfur species present in the fossil fuel that is further extremely cost effective and can be readily integrated into conventional oil refining processes. There is likewise a need in the art for such a method that is effective in removing nitrogen-containing compounds that is further cost-effective and substantially effective in removing virtually all of the nitrogen species present in such fossil fuel. Still further, there is a need for such a process that is capable of enhancing the quality of the refined fossil fuel treated thereby and that can be readily utilized in either large scale or small scale refinery operations.

BRIEF SUMMARY OF THE INVENTION

It has now been discovered that fossil fuels, crude oil fractions, and may of the components that are derived from these sources can undergo a variety of beneficial conversions and be upgraded in a variety of ways by a process that applies sonic energy to these materials in a reaction medium. The organic material is combined with an aqueous phase to form an emulsion, placing the phases in intimate contact during the exposure to sonic energy. Hydrogen gas is not required, nor are the high temperature and pressure that are commonly needed for hydrogenations of the prior art. In certain embodiments of the invention, the treatment with sonic energy is performed in the presence of a hydroperoxide, and in certain embodiments as well, a transition metal catalyst is used. One of the surprising discoveries associated with certain embodiments of this invention, however, is that the conversions achieved by this invention can be achieved without the inclusion of a hydroperoxide in the reaction mixture.

Included among the conversions achieved by the present invention are the removal of organic sulfur compounds, the removal of organic nitrogen compounds, the saturation of double bonds and aromatic rings, and the opening of rings in fused-ring structures. The invention thus resides in part in the process of using sonic energy to achieve these conversions. The invention further resided in processes for converting aromatics to cycloparaffins, and opening one or more rings in a fused-ring structure, thereby for example converting naphthalenes to monocyclic aromatics, anthracenes to naphthalenes, fused heterocyclic rings such as benzothiophenes, dibenzothiophenes, benzofurans, quinolines, indoles, and the like to substituted benzenes, acenaphthalenes and acenaphthenes to indanes and indenes, and monocyclic aromatics to noncyclic structures. Further still, the invention resides in processes for converting olefins to paraffins, and in processes for breaking carbon-carbon bonds, carbon-sulfur bonds, carbon-metal bonds, and carbon-nitrogen bonds.

In addition to the foregoing, API gravities of fossil fuels and crude oil fractions are raised (i.e., the densities lowered) as a result of treatments in accordance with the invention. Moreover, the invention raises the cetane index of petroleum fractions and cracking products whose boiling points or ranges are in the diesel range. The term "diesel range" is used herein in the industry sense to denote the portion of crude oil that distills out after naphtha, and generally within the temperature range of approximately 200° C. (392° F.) to 370° C. (698° F.). Fractions and cracking products whose boiling ranges are contained in this range, as well as those that overlap with this range to a majority extent, are included. Examples of refinery fractions and streams within the diesel range are fluid catalytic cracking (FCC) cycle oil fractions, coker distillate fractions, straight run diesel fractions, and blends. The invention also imparts other beneficial changes such as a lowering of boiling pints and a removal of components that are detrimental to the performance of the fuel and those that affect refinery processes and increase the cost of production of the fuel. Thus, for example, FCC cycle oils can be treated in accordance with the invention to sharply reduce their aromatics content.

A further group of crude oil fractions for which the invention is particularly useful are gas oils, which term is used herein as it is in the petroleum industry, to denote liquid petroleum distillates that have higher boiling points than naphtha. The initial boiling point may be as low as 400° F. (200° C.), but the preferred boiling range is about 500° F. to about 1100° F. (Approximately equal to 260° C. to 595° C.). Examples of fractions boiling within this range are FCC slurry oil, light and heavy gas oils, so termed in view of their different boiling points, and coker gas oils. All terms in this and the preceding paragraph are used herein as they are in the petroleum art.

By virtue of the conversions that occur as a result of the process of this invention, hydrocarbon streams experience changes in their cold flow properties, including their pour points, cloud points, and freezing points. Sulfur compounds, nitrogen compounds, and metal-containing compounds are also reduced, and the use of a process in accordance with this invention significantly lessens the burden on conventional processes such as hydrodesulfurization, hydro-denitrogenation, and hydrodemetallization, which can therefore be performed with greater effectiveness and efficiency.

These and other advantages, features, applications and embodiments of the invention are made more apparent by the description that follows.

DETAILED DESCRIPTION OF THE INVENTION AND SPECIFIC EMBODIMENTS

The term "liquid fossil fuel" is used herein to denote any carbonaceous liquid that is derived from petroleum, coal, or any other naturally occurring material, as well as processed fuels such as gas oils and products of fluid catalytic cracking units, hydrocracking units, thermal cracking units, and cokers, and that is used to generate energy for any kind of use, including industrial uses, commercial uses, governmental uses, and consumer uses. Included among these fuels are automotive fuels such as gasoline, diesel fuel, jet fuel, and rocket fuel, as well as petroleum residuum-based fuel oils including bunker fuels and residual fuels. No. 6 fuel oil, for example, which is also known as "Bunker C" fuel oil, is used in oil-fired power plants as the major fuel and is also used as a main propulsion fuel in deep draft vessels in the shipping industry. No. 4 fuel oil and No. 5 fuel oil are used to heat large buildings such as schools, apartment buildings, and office buildings, and large stationary marine engines. The heaviest fuel oil is the vacuum residuum from the fractional distillation, commonly referred to as "vacuum resid," with a boiling point of 565° C. and above, which is used as asphalt and coker feed. The present invention is useful in the treatment of any of these fuels and fuel oils for purposes of reducing the sulfur content, the nitrogen content, and the aromatics content, and for general upgrading to improve performance and enhance utility. Certain embodiments of the invention involve the treatment of fractions or products in the diesel range which include, but are not limited to, straight-run diesel fuel, feed-rack diesel fuel (as commercially available to consumers at gasoline stations), light cycle oil, and blends of straight-run diesel and light cycle oil ranging in proportion from 10:90 to 90:10 (straight-run diesel:light cycle oil).

The term "crude oil fraction" is used herein to denote any of the various refinery products produced from crude oil, either by atmospheric distillation or vacuum distillation, including fractions that have been treated by hydrocracking, catalytic cracking, thermal cracking, or coking, and those that have been desulfurized. Examples are light straight-run naphtha, heavy straight-run naphtha, light steam-cracked naphtha, light thermally cracked naphtha, light catalytically cracked naphtha, heavy thermally cracked naphtha, reformed naphtha, aklylate naphtha, kerosene, hydrotreated kerosene, gasoline and light straight-run gasoline, straight-run diesel, atmospheric gas oil, light vacuum gas oil, heavy vacuum gas oil, residuum, vacuum residuum, light coker gasoline, coker distillate, FCC (fluid catalytic cracker) cycle oil, and FCC slurry oil.

The term "fused-ring aromatic compound" is used herein to denote compounds containing two or more fused rings at least one of which is a phenyl ring, with or without substituents, and including compounds in which all fused rings are phenyl or hydrocarbyl rings as well as compounds in which one or more of the fused rings are heterocyclic rings. Examples are substituted and unsubstituted naphthalenes, anthracenes, benzothiophenes, dibenzothiophenes, benzofurans, quinolines, and indoles.

The term "olefins" is used herein to denote hydrocarbons, primarily those containing two or more carbon atoms and one or more double bonds.

Fossil fuels and crude oil fractions treated by sonic energy in accordance with this invention have significantly improved properties relative to the same materials prior to treatment, these improvements rendering the products unique and improving their usefulness as fuels. Specifically, the present invention is operative to open fused-ring aromatic compounds by converting the same to saturated compounds. Such process is likewise operative to convert olefins to saturated compounds such that at least one or more of the double bonds present are replaced by single bonds.

Another of these properties improved via the present invention is the API gravity. The term "API gravity" is used herein as it is among those skilled in the art of petroleum and petroleum-derived fuels. In general, the term represents a scale of measurement adopted by the American Petroleum Institute, the values on the scale increasing as specific gravity values decrease. Thus, a relatively high API gravity means a relatively low density. The API gravity scale extends from −20.0 (equivalent to a specific gravity of 1.2691) to 100.0 (equivalent to a specific gravity of 0.6112).

The process of the present invention is applicable to any liquid fossil fuels, preferably those with API gravities within the range of −10 to 50, and most preferably within the range of 0 to 45. For materials boiling in the diesel range, the process of the invention is preferably performed in such a manner that the starting materials are converted to products with API gravities within the range of 37.5 to 45. FCC cycle oils are preferably converted to products with API gravities within the range of 30 to 50. For liquid fossil fuels in general, the process of the invention is preferably performed to achieve an increase in API gravity by an amount ranging from 2 to 30 API gravity units, and more preferably by an amount ranging from 7 to 25 units. Alternatively stated, the invention preferably increases the API gravity from below 20 to above 35.

As stated above, fossil fuels boiling within the diesel range that are treated in accordance with this invention experience an improvement in their cetane index (also referred to in the art as the "cetane number") upon being treated in accordance with this invention. Diesel fuels to which the invention is of particular interest in this regard are those having a cetane index greater than 40, preferably within the range of 45 to 75, and most preferably within the range of 50 to 65. The improvement in cetane index can also be expressed in terms of an increase over that of the material prior to treatment with sonic energy. In certain preferred embodiments, the increase is by an amount ranging from 1 to 40 cetane index units, and more preferably by an amount ranging from 4 to 20 units. As a still further means of expression, the invention preferably increases the cetane index from below 47 to about 50. This invention can be used to produce diesel fuels having a cetane index of greater than 50.0, or preferably greater than 60.0. In terms of ranges, the invention is capable of producing diesel fuels having a cetane index of from about 50.0 to about 80.0, and preferably from about 60.0 to about 70.0. The cetane index or number has the same meaning in this specification and the appended claims that it has among those skilled in the art of automotive fuels.

As noted above, certain embodiments of the invention involve the inclusion of hydroperoxide in the reaction mixture. The term "hydroperoxide" is used herein to denote a compound of the molecular structure

in which R represents either a hydrogen atom or an organic or inorganic group. Examples of hydroperoxides in which R is an organic group are water-soluble hydroperoxides such as methyl hydroperoxide, ethyl hydroperoxide, isopropyl hydroperoxide, n-butyl hydroperoxide, sec-butyl hydroperoxide, tert-butyl hydroperoxide, 2-methoxy-2-propyl hydroperoxide, tert-amyl hydroperoxide, and cyclohexyl hydroperoxide. Examples of hydroperoxides in which R is an inorganic group are peroxonitrous acid, peroxophosphoric acid, and peroxosulfuric acid. Preferred hydroperoxides are hydrogen peroxide (in which R is a hydrogen atom) and tertiary-alkyl peroxides, notably tert-butyl peroxide.

The aqueous fluid that may optionally be combined with the fossil fuel or other liquid organic starting material in the processes of this invention may be water or any aqueous solution. The relative amounts of organic and aqueous phases may vary, and although they may affect the efficiency of the process or the ease of handling the fluids, the relative amounts are not critical to this invention. In this regard, it is contemplated that the aqueous fluid may be present anywhere from about 0% to 99% by weight of the combined organic and aqueous phases. In most cases, however, best results will be achieved when the volume ratio of organic phase to aqueous phase is from about 8:1 to about 1:5, preferably from about 5:1 to about 1:1, and most preferably from about 4:1 to about 2:1, Although optional, when a hydroperoxide is present, the amount of hydroperoxide relative to the organic and aqueous phases can be varied, and although the conversion rate and yield may vary somewhat with the proportion of hydroperoxide, the actual proportion is not critical to the invention, and any excess amounts will be eliminated by the application of sonic energy. For example, when the $H_2O_2$ amount is calculated as a component of the combined organic and aqueous phases, favorable results will generally be achieved in most systems with $H_2O_2$ being present within the range of from about 0.0003% to about 70% by volume (as $H_2O_2$), and preferably from about 1.0% to about 20% of the combined phases. For hydroperoxides other than $H_2O_2$, the preferred concentrations will be those of equivalent amounts.

In certain embodiments of this invention, a surface active agent or other emulsion stabilizer is included to stabilize the emulsion as the organic and aqueous phases are being prepared for the exposure to sonic energy. Certain petroleum fractions contain surface active agents as naturally-occurring components of the fractions, and these agents may serve by themselves to stabilize the emulsion. In other cases, synthetic or non-naturally-occurring surface active agents can be added. Any of the wide variety of known materials that are effective as emulsion stabilizers can be used. Listings of these materials are available in McCutcheon's Volume 1: Emulsifiers & Detergents—1999 North American Edition, McCutcheon's Division, MC Publishing Co., Glen Rock, N.J., USA, and other published literature. Cationic, anionic and nonionic surfactants can be used. Preferred cationic species are quaternary ammonium salts, quaternary phosphonium salts and crown ethers. Examples of quaternary ammonium salts are tetrabutyl ammonium bromide, tetrabutyl ammonium hydrogen sulfate, tributylmethyl ammonium chloride, benzyltrimethyl ammonium chloride, benzyltriethyl ammonium chloride, methyltricaprylyl ammonium chloride, dodecyltrimethyl ammonium bromide, tetraoctyl ammonium bromide, cetyltrimethyl ammonium chloride, and trimethyloctadecyl ammonium hydroxide. Quaternary ammonium halides are useful in many systems, and the most preferred are dodecyltrimethyl ammonium bromide and tetraoctyl ammonium bromide.

The preferred surface active agents are those that will promote the formation of an emulsion between the organic and aqueous phases upon passing the liquids through a common mixing pump, but that will spontaneously separate the product mixture into aqueous and organic phases suitable for immediate separation by decantation or other simple phase separation procedures. One class of surface active agents that will accomplish this is liquid aliphatic $C_{15}$–$C_{20}$ hydrocarbons and mixtures of such hydrocarbons, preferably those having a specific gravity of at least about 0.82, and most preferably at least about 0.85. Examples of hydrocarbon mixtures that meet this description and are particularly convenient for use and readily available are mineral oils, preferably heavy or extra heavy mineral oil. The terms "mineral oil", "heavy mineral oil," and "extra heavy mineral oil" are well known in the art and are used herein in the same manner as they are commonly used in the art. Such oils are readily available from commercial chemicals suppliers throughout the world.

When added emulsifying agent is used in the practice of this invention, the appropriate amount of agent to use is any amount that will perform as described above. The amount is otherwise not critical and may vary depending on the choice of the agent, and in the case of mineral oil, the grade of mineral oil. The amount may also vary with the fuel composition, the relative amounts of aqueous and organic phases, and the operating conditions. Appropriate selection will be a matter of routine choice and adjustment to the skilled engineer. In the case of mineral oil, best and most efficient results will generally be obtained using a volume ratio of mineral oil to the organic phase 1 of from about 0.00003 to about 0.003.

In certain embodiments of the invention, a metallic catalyst may be included in the reaction system to regulate the activity of the hydroxyl radical produced by the hydroperoxide. Examples of such catalysts are transition metal catalysts, and preferably metals having atomic numbers of 21 through 29, 39 through 47, and 57 through 79. Particularly preferred metals from this group are nickel, sulfur, tungsten (and tungstates), cobalt, molybdenum, and combinations thereof. In certain systems within the scope of this invention, Fenton catalysts (ferrous salts) and metal ion catalysts in general such as iron (II), iron (III), copper (I), copper (II), chromium (III), chromium (VI), molybdenum, tungsten, cobalt, and vanadium ions, are useful. Of these, iron (II), iron (III), copper (II), and tungsten catalysts are preferred. For some systems, such as crude oil, Fenton-type catalysts are preferred, while for others, such as diesel-containing systems, tungsten or tungstates are preferred. Tungstates include tungstic acid, substituted tungstic acids such as phosphotungstic acid, and metal tungstates. In certain embodiments of the invention, nickel, silver, or tungsten, or combinations of these three metals, are particularly useful. The metallic catalyst when present will be used in a catalytically effective amount, which means any amount that will enhance the progress of the reaction (i.e., increase the reaction rate) toward the desired goal, particularly the oxidation of the sulfides to sulfones. The catalyst may be present as metal particles, pellets, flakes, shavings, or other similar forms, retained in the sonic energy delivery chamber by physical barriers such as screens or other restraining means as the reaction medium is allowed to pass through.

Of the aforementioned catalysts, among the more preferred include phosphotungstic acid or a mixture of sodium tungstate and phenylphosphonic acid may be utilized based upon lower price and ready availability in bulk form. It should be understood, however, that use of such catalysts is optional and required for one skilled in the art to practice the present invention.

The temperature of the combined aqueous and organic phases during exposure to the sonic energy, discussed below, may vary widely, although in most cases it is contemplated that the temperature will be within the range of from about 0° C. to about 500° C., preferably from about 20° C. to about 200° C., and most preferably from about 25° C. to about 125°. In many cases, it will be beneficial to preheat the two phases, either individually or together, prior to subjecting the same to sonic energy. The optimal degree of preheating will vary with the particular organic liquid to be treated and the ratio of aqueous to organic phases, provided that the temperature is not high enough to volatilize the organic liquid. With diesel fuel, for example, best results will most often be obtained by preheating the fuel to a temperature of at least about 70° C., and preferably from about 70° C. to about 100° C. The aqueous phase may be preheated to any temperature up to its boiling point.

The sonic energy used in accordance with this invention consists of sound-like waves whose frequency is within the range of from about 2 kHz to about 100 kHz, and preferably within the range of from about 10 kHz to about 19 kHz. In a more highly preferred embodiment, the sonic energy utilized possesses a frequency within the range from about 17 kHz to 19 kHz.

As will be appreciated by those skilled in the art, such sonic waves can be generated from mechanical, electrical, electromagnetic, or other known energy sources. In this regard, the various methods of producing and applying sonic energy, and commercial suppliers of sonic energy producing equipment, are well known among those skilled in the art. Exemplary of such systems capable of being utilized in the practice of the present invention to impart the necessary degree of sonic energy disclosed herein include those ultrasonic systems produced by Hielscher Systems of Teltow, Germany and distributed domestically through Hielscher U.S.A., Inc. of Ringwood, N.J.

The intensity of the sonic energy applied will possess a sufficient magnitude to effectuate the oxidation of the sulfur and nitrogen-containing species present in the fossil fuel being treated, as well as open the fused ring compounds and saturate the olefin compounds that may be present. Presently, it is believed that the sonic energy applied should have a displacement amplitude in the range of from about 10 to 300 micrometers, and may be adjusted according to whether the processes of the present invention are conducted at either elevated temperatures and/or pressures. To the extent the processes of the present invention are conducted at ambient temperature and pressure, a displacement amplitude ranging from about 30 to 120 micrometers may be appropriate, with a range of approximately 36 to 60 micrometers being preferred. The preferred range of power that should be delivered per unit volume (i.e., power density) should preferably range from about 0.01 watts per cubic centimeter to about 100.00 watts per cubic centimeter of liquid treated, and preferably from about 1_watt per cubic centimeter to about 20 watts per cubic centimeter of liquid treated. It should be understood, however, that higher power densities could be attained, given the ability of existing equipment to produce an output of power as high as 16 kilowatts, and that such higher output of power can be utilized to facilitate the reactions of the present invention.

The exposure time of the reaction medium to the sonic energy is not critical to the practice or to the success of the invention, and the optimal exposure time will vary according to the type of fuel being treated. An advantage of the invention however is that effective and useful results can be achieved with a relatively short exposure time. A preferred range of exposure times is from about 1 second to about 30 minutes, and a more preferred range is from about 1 second to 1 minute, with excellent results being obtained with exposure times of approximately 5 seconds and possibly less.

Improvements in the efficiency and effectiveness of the process can also be achieved by recycling or secondary treatments with sonic energy. A fresh supply of water may for example be added to the treated and separated organic phase to form a fresh emulsion which is then exposed to further sonic energy treatment, either on a batch or continuous bases. Re-exposure to sonic energy can be repeated multiple times for even better results, and can be readily achieved in a continuous process by a recycle stream or by the use of a second state sonic energy treatment, and possibly a third stage sonic energy treatment, with a fresh supply of water at each stage.

In systems where the reaction induced by the application of sonic energy produces undesirable byproducts in the organic phase, these byproducts can be removed by conventional methods of extraction, absorption, or filtration. When the byproducts are polar compounds, for example, the extraction process can be any process that extracts polar compounds from a non-polar liquid medium. Such processes include solid-liquid extraction, using absorbents such as silica gel, activated alumina, polymeric resins, and zeolites. Liquid-liquid extraction can also be used, with polar solvents such as dimethyl formamide, N-methylpyrrolidone, or acetonitrile. A variety of organic solvents that are either immiscible or marginally miscible with the fossil fuel, can be used. Toluene and similar solvents are examples.

Alternatively, to the extent any desirable byproducts are produced in the organic phase which consists of the oxidized nitrogen and sulfur-containing species, such as sulfoxides and sulfones, the same may be treated pursuant to conventional hydrodesulfurization processes. In this regard, the oxidative processes of the present invention may be incorporated into those processes disclosed in pending U.S. patent application Ser. No. 10/411,796, filed on Apr. 11, 2003, entitled sulfone removal process, and U.S. patent application Ser. No. 10/429,369, filed on May 5, 2003, entitled PROCESS FOR GENERATING AND REMOVING SULFOXIDES FROM FOSSIL FUEL, the teachings of each of which are expressly incorporated herein by reference.

The sonic energy-assisted reformation reaction may generate heat, and with certain starting materials it is preferable to remove some of the generated heat to maintain control over the reaction. When gasoline is treated in accordance with this invention, for example, it is preferable to cool the reaction medium when the same is subjected to sonic energy. Cooling is readily achievable by conventional means, such as the use of a liquid coolant jacket or a coolant circulating through a cooling coil in the interior of the chamber where the sonic energy is deployed. Water at atmospheric pressure is an effective coolant for these purposes. Suitable cooling methods or devices will be readily apparent to those skilled in the art. Cooling is generally unnecessary with diesel fuel, gas oils, and resids.

Operating conditions in general for the practice of this invention an vary widely, depending on the organic material being treated and the manner of treatment. The pH of the emulsion, for example, may range from as low as 1 to as high as 10, although best results are presently believed to be achieved within a pH range of 2 to 7. The pressure of the emulsion as it is subjected to sonic energy can likewise vary, ranging from subatmospheric (as low as 5 psia or 0.34 atmospheres) to as high as 3,000 psia (214 atmospheres), although preferably less than about 400 psia (27 atmospheres), and more preferably less than about 50 psia (3.4 atmospheres), and most preferably from about atmospheric pressure to about 50 psia.

The operating conditions described in the preceding paragraphs that relate to the application of sonic energy, the inclusion of emulsion stabilizers and catalysts, and the general conditions of temperature and pressure apply to the process of the invention regardless of whether or not hydrogen peroxide or any other hydroperoxide is present in the reaction mixture. One of the unique and surprising discoveries of this invention is that the levels of sulfur-containing compounds and nitrogen-containing compounds are reduced substantially regardless of whether a hydroperoxide is present. Moreover, the process as disclosed herein can be performed either in a batchwise manner or in a continuous-flow operation.

Additional modifications and improvements of the present invention may also be apparent to those of ordinary skill in the art. Thus, the particular combination of parts and steps described and illustrated herein is intended to represent only certain embodiments of the present invention, and is not intended to serve as limitations of alternative devices and methods within the spirit and scope of the invention.

What is claimed:

1. A process for removing organic sulfur from a crude oil fraction, said process comprising:
   (a) providing a crude oil fraction and exposing said crude oil fraction to a sonic energy in the absence of an aqueous phase having a surface active agent; and
   (b) contacting said crude oil fraction exposed to sonic energy in step (a) with hydrogen gas under conditions causing conversion of said organic sulfur originally present in said crude oil fraction to hydrogen sulfide by hydrodesulfurization.

2. The processing of claim 1 wherein said crude oil fraction is a fraction boiling within the diesel range.

3. The process of claim 2 wherein said crude oil fraction is a member selected from the group consisting of fluid catalytic cracking (FCC) cycle oil fractions, coker distillate fractions, straight run diesel fractions, and blends thereof.

4. The process of claim 1 wherein said crude oil fraction is a fraction boiling within the gas oil range.

5. The process of claim 4 wherein said crude oil fraction is a member selected form the group consisting of FCC cycle oil, FCC slurry oil, light gas oil, heavy gas oil, and coker gas oil.

6. The process of claim 1 wherein in step (a), said crude oil fraction is exposed to said sonic energy in the presence of hydrogen peroxide or hydroperoxides.

* * * * *

US007081196C1

(12) EX PARTE REEXAMINATION CERTIFICATE (8415th)
United States Patent
Cullen

(10) Number: US 7,081,196 C1
(45) Certificate Issued: *Jul. 19, 2011

(54) TREATMENT OF CRUDE OIL FRACTIONS, FOSSIL FUELS, AND PRODUCTS THEREOF WITH SONIC ENERGY

(75) Inventor: Mark Cullen, Reno, NV (US)

(73) Assignee: Petrosonics, LLC, San Diego, CA (US)

Reexamination Request:
No. 90/010,728, Nov. 2, 2009

Reexamination Certificate for:
Patent No.: 7,081,196
Issued: Jul. 25, 2006
Appl. No.: 10/431,666
Filed: May 8, 2003

(*) Notice: This patent is subject to a terminal disclaimer.

(51) Int. Cl.
*C10G 45/04* (2006.01)

(52) U.S. Cl. .................. 208/211; 208/213; 208/208; 208/196; 208/192; 208/222; 208/227; 208/229; 44/904; 44/628

(58) Field of Classification Search .................. None
See application file for complete search history.

(56) References Cited

U.S. PATENT DOCUMENTS

| | | | |
|---|---|---|---|
| 2,253,308 A | 8/1941 | Rosen | |
| 2,671,049 A | 3/1954 | Brown | |
| 2,697,682 A | 12/1954 | Porter | |
| 2,834,717 A | 5/1958 | Shiah | |
| 2,919,975 A | 1/1960 | Moore | |
| 3,284,342 A | 11/1966 | Nathan | |
| 3,341,448 A | 9/1967 | Ford | |
| 3,497,005 A | 2/1970 | Pelopsky et al. | |
| 3,565,793 A | 2/1971 | Herbstman | |
| 3,595,778 A | 7/1971 | Smetana | |
| 3,616,375 A | 10/1971 | Inoue | 204/157.61 |
| 3,719,589 A | 3/1973 | Herbstman | |
| 3,755,185 A | 8/1973 | Waldmann et al. | |
| 3,816,301 A | 6/1974 | Sorgenti | |
| 3,914,292 A | 10/1975 | Brunie et al. | |
| 4,391,608 A | 7/1983 | Dondelewski | |
| 5,110,443 A | 5/1992 | Gregoli et al. | |
| 5,547,563 A | 8/1996 | Stowe | |
| 5,723,039 A | 3/1998 | Zosimov et al. | |
| 5,753,102 A | 5/1998 | Funakoshi et al. | |
| 5,824,214 A | 10/1998 | Paul et al. | |
| 5,948,242 A | 9/1999 | Ohsol et al. | |
| 5,985,137 A | 11/1999 | Ohsol et al. | |
| 6,279,653 B1 | 8/2001 | Wegener et al. | |
| 6,402,939 B1 | 6/2002 | Yen et al. | |
| 6,402,940 B1 | 6/2002 | Rappas | |
| 6,406,616 B1 | 6/2002 | Rappas et al. | |
| 6,500,219 B1 | 12/2002 | Gunnerman | |
| 6,544,411 B2 | 4/2003 | Varadaraj | |
| 2002/0029997 A1 | 3/2002 | Rappas et al. | |
| 2003/0051988 A1 | 3/2003 | Gunnerman et al. | |
| 2003/0085156 A1 | 5/2003 | Schoonover | |

FOREIGN PATENT DOCUMENTS

| | | |
|---|---|---|
| EP | 0482841 | 4/1992 |
| EP | 1635924 | 12/2007 |
| EP | 1668095 | 3/2009 |
| WO | 0015734 | 3/2000 |
| WO | 02103322 A2 | 12/2002 |
| WO | 2004101100 A2 | 11/2004 |

OTHER PUBLICATIONS

Hu, Michael C., Rigorous Hydrotreater Simulation, PTQ, Spring 2002, pp. 85–91.
Liotta, Frank J., Production of Ultra–Low Sulfur Fuels by Selective Hydroperoxide Oxidation, National Petrochemical & Refiners Association Annual Meeting, Mar. 23–25, pp. 1–9. 2003.
Complaint:*SULPHCO, Inc.*, a Nevada corporation,vs. *Mark Cullen*, an individual, filed Jun. 26, 2006, Second Judicial District Court of the State of Nevada in and for the County of Washoe.
Decision on Appeal; United States Patent and Trademark Office before the Board of Patent Appeals and Interferences; Ex Parte Mark Cullen, Appeal 2008–006125; Decided Sep. 15, 2009; 13 pages.
Notice of Opposition; Application No./Patent No. 04781388.6–1213/ 1668095; dated Jan. 19, 2010; 27 pages.
Response to Office Action; Re European patent application No. 04 781 388.6; dated Munich, Aug. 14, 2008; 28 pages.
1st Auxiliary Request: Re European patent application No. 04 781 388.6; dated Munich, Sep. 8, 2008; 6 pages.
International Preliminary Report on Patentability; Application No. PCT/US2004/026683; issued Feb. 21, 2006; 6 pages.
European Patent Office Communication Re Application No. 04 781 388.6 1213; Dated Oct. 26, 2007; 4 pages.
Summons to Attend Oral Proceedings; Re Application No. 04 781 388.6–1213; Dated May 26, 2008; 4 pages.
United States Department of Labor; Occupational Safety & Health Administration: Occupational Safety and Health Guideline for Hydrogen Peroxide; 11 pages (date unknown).
Stipulation For Dismissal: *SULPHCO, Inc., a Nevada corporation*, vs. *Mark Cullen*, an individual , filed Jun. 26, 2006, Second Judicial District Court of the State of Nevada in and for the County of Washoe, signed Apr. 25, 2007.
BPAI Appeal Decision, U.S. Appl. No. 10/644,255; Affirmed–in–part; mailed Sep. 15, 2009.
BPAI Appeal Decision; U.S. Appl. No. 11/371,567; Affirmed; mailed Jul. 27, 2009.
BPAI Appeal Decision; U.S. Appl. No. 11/096,691; Affirmed; mailed Jul. 27, 2009.
BPAI Appeal Decision; U.S. Appl. No. 10/411,796; Affirmed; mailed Jul. 27, 2010.

(Continued)

*Primary Examiner*—Carlos Lopez

(57) ABSTRACT

In crude oil fractions, fossil fuels, and organic liquids in general in which it is desirable to reduce the levels of sulfur-containing and nitrogen-containing components, the process reduces the level of these compounds via the application of sonic energy. The process can be performed both with and without the added presence of an oxidizing agent, and with or without elevated temperature and/or pressure. The invention is performed either as a continuous process or a batch process.

OTHER PUBLICATIONS

Opposition against EP patent No. 1 668 095; submitted by Notarbartolo & Gervasi; mailed Jul. 19, 2010; 6 pages.

Chao, Dr. Sherman S.; Ultrasound–Promoted Chemical Desulfurization of Illinois Coals; Final Technical Report Sep. 1, 1990 through Aug. 31, 1991; 38 pages.

Notice of Allowance and Fees Due; Treatment of Crude Oil Fractions, Fossil Fuels, and Products Thereof; U.S. Appl. No. 10/644,255, mailed Sep. 27, 2010.

Non–Final Office Action; Treatment of Crude Oil Fractions, Fossil Fuels and Products Thereof With Sonic Energy; U.S. Appl. No. 11/371,567, mailed Oct. 2, 2010.

Non–Final Office Action, Treatment of Crude Oil Fractions, Fossil Fuels and Products Thereof With Sonic Energy; U.S. Appl. No. 11/096,691, mailed Oct. 1, 2010.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 1, lines 5-14:

[The present application is a continuation-in-part of U.S. application Ser. No. 09/863,127, filed May 22, 2001 now abandoned by Gunnerman et al., entitled A TREATMENT OF CRUDE OIL FRACTIONS, FOSSIL FUELS, AND PRODUCTS WITH ULTRASOUND, the teachings of which are expressly incorporated herein by reference.]

AS A RESULT OF REEXAMINATION, IT HAS BEEN DETERMINED THAT:

Claims 1 and 6 are determined to be patentable as amended.

Claims 2-5 dependent on an amended claim, are determined to be patentable.

1. A process for removing organic sulfur from a crude oil fraction, said process [comprising] *consisting of*:
   (a) providing a crude oil fraction and *oxidizing the organic sulfur in said crude oil fraction by* exposing said crude oil fraction to *a hydroperoxide and* a sonic energy in the absence of an aqueous phase [having] *and in the absence of* a surface active agent; and
   (b) [contacting] *directly feeding* said crude oil fraction exposed to sonic energy in step (a) *in its entirety to a hydrotreater* with hydrogen gas under conditions causing conversion of said organic sulfur originally present in said crude oil fraction to hydrogen sulfide by hydrodesulfurization *in the absence of sonic energy* .

6. The process of claim 1 wherein in step (a), *the hydroperoxide* said crude oil fraction is exposed to [said sonic energy in the presence of] *is* hydrogen peroxide [or hydroperoxides].

\* \* \* \* \*